United States Patent [19]
DuBois

[11] Patent Number: 5,078,377
[45] Date of Patent: Jan. 7, 1992

[54] DOCUMENT FEEDER

[76] Inventor: R. Clark DuBois, 332 Wakeman Rd., Fairfield, Conn. 06430

[21] Appl. No.: 541,789

[22] Filed: Jun. 21, 1990

Related U.S. Application Data

[63] Continuation of Ser. No. 247,384, Sep. 21, 1988, abandoned, which is a continuation-in-part of Ser. No. 172,978, Mar. 28, 1988, Pat. No. 4,925,178, and a continuation of Ser. No. 182,614, Apr. 18, 1988, abandoned.

[51] Int. Cl.$^5$ .............................................. B65H 5/06
[52] U.S. Cl. ........................................ 271/3; 271/245; 271/902
[58] Field of Search ........................... 271/3, 245, 902

[56] References Cited

U.S. PATENT DOCUMENTS 4,579,327  4/1986  Furuichi ........................ 271/902
4,667,951  5/1987  Honjo ............................ 271/902

Primary Examiner—Richard A. Schacher
Attorney, Agent, or Firm—Francis J. Bouda

[57] ABSTRACT

A document feeder is disclosed which can be used with glass-top machines. It fits such copiers, having either a stationery or a moving sheet-support. It is small, lightweight, compact and portable. It feeds the bottom-most page first from a face-up stack of sheets, and re-stacks the copied sheets, face-up, with the bottom sheet at the bottom of the new stack. It operates in excess of 25 copies per minute. Drive wheels feed the document-to-be-copied onto the copier glass and, when the wheels are reversed, remove the document from the glass into a stacking area. The removal of a document from the glass and the placement of the next document onto the glass occur during the non-copying time of the continuously-running copier. The feed/separation act upon the center of the documents. The copier can derive its driving force and energy from the copier or can have its own independent power source.

2 Claims, 9 Drawing Sheets

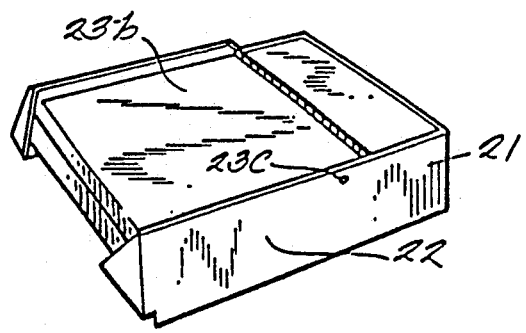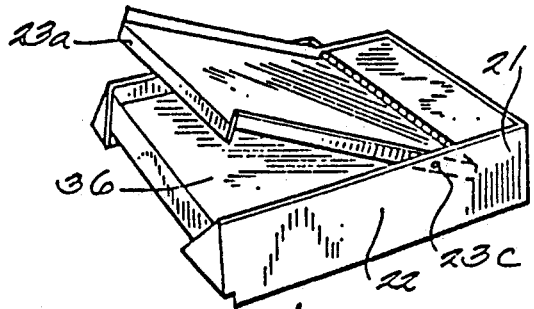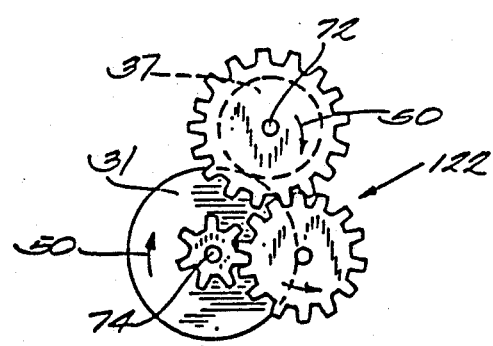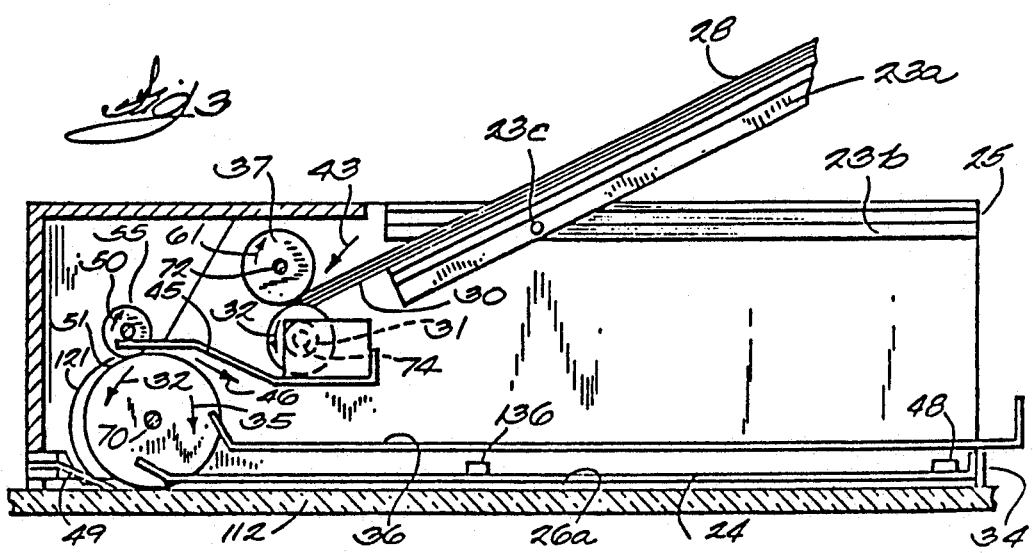

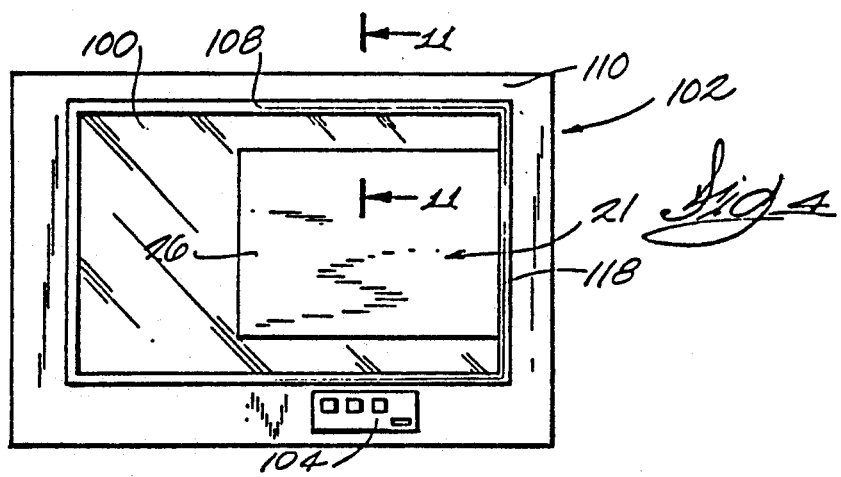
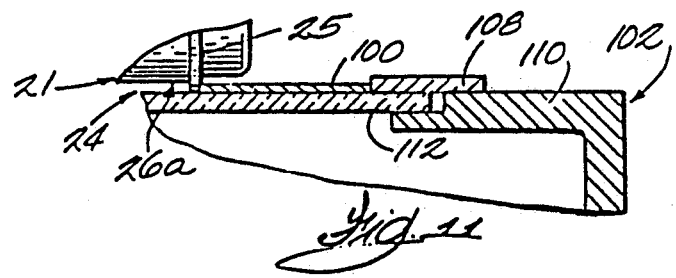
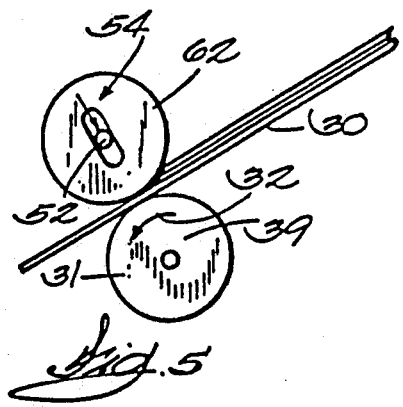
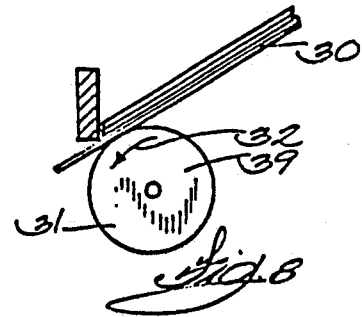
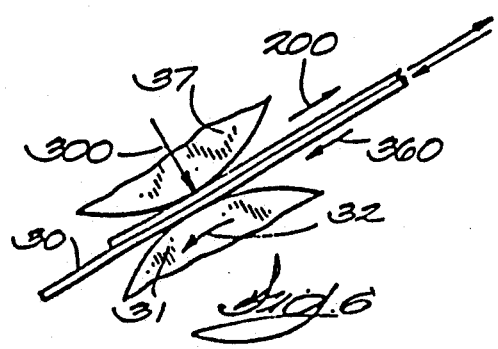
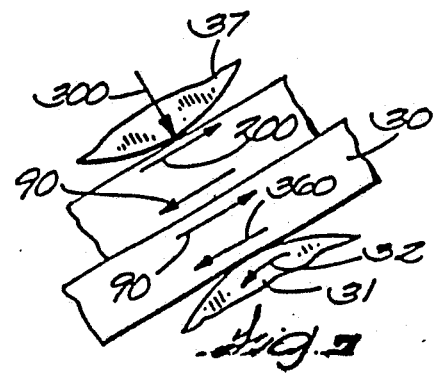

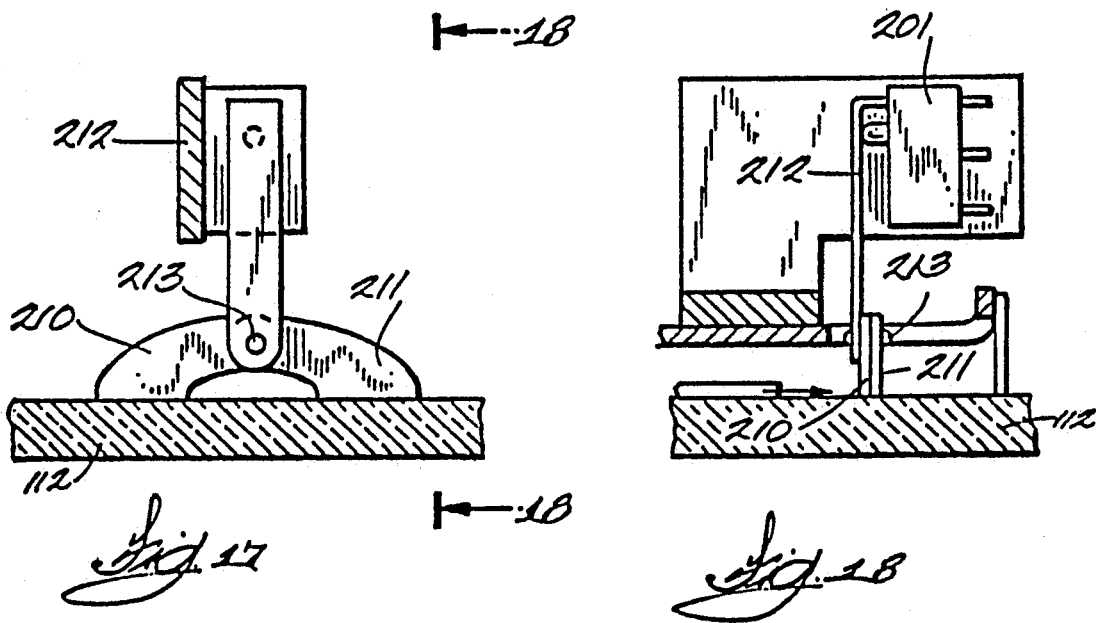

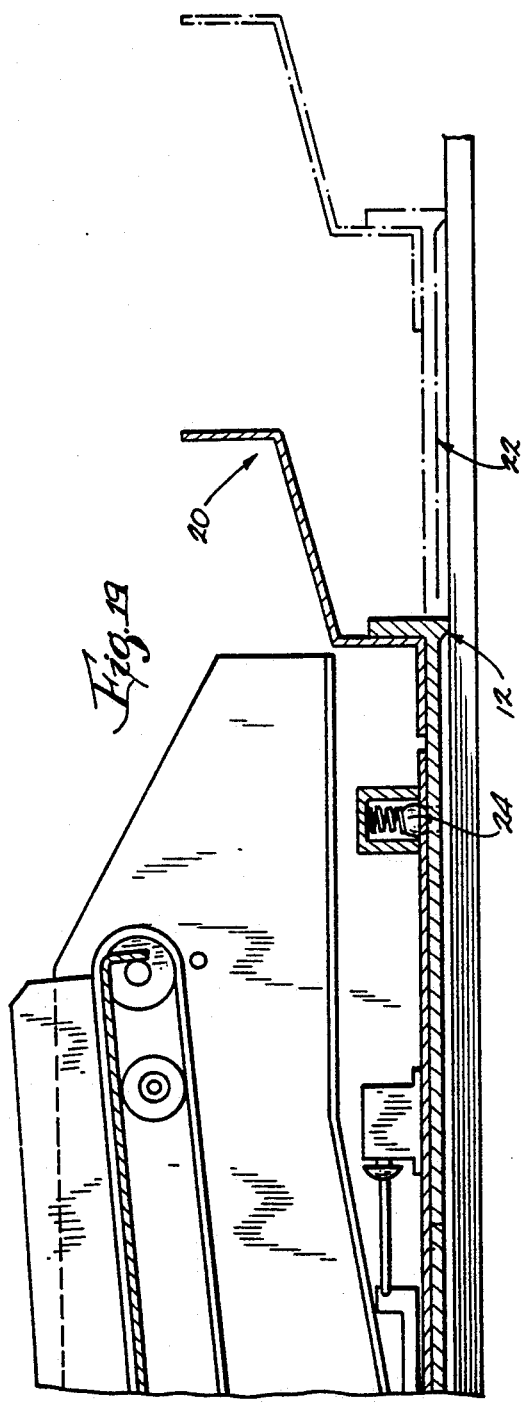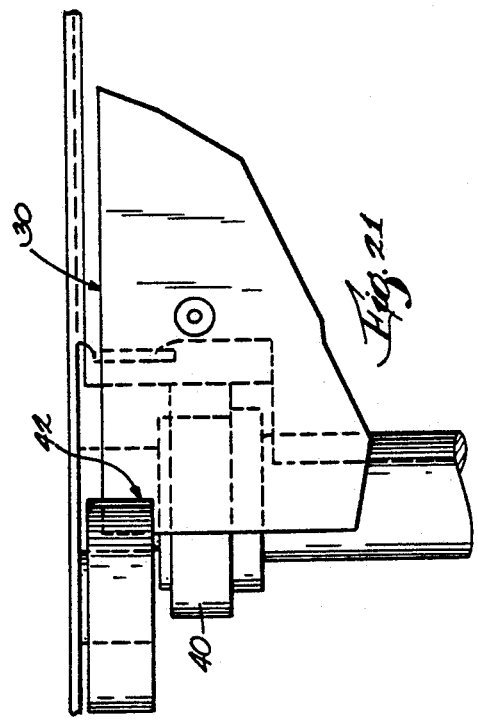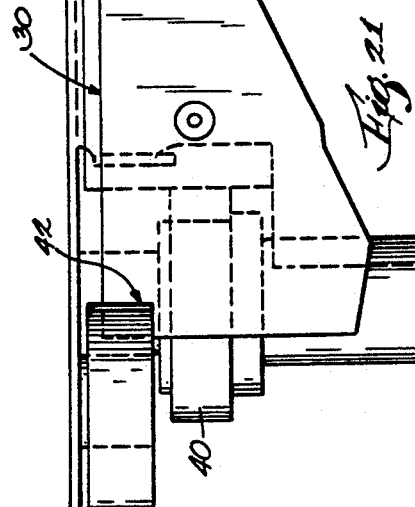

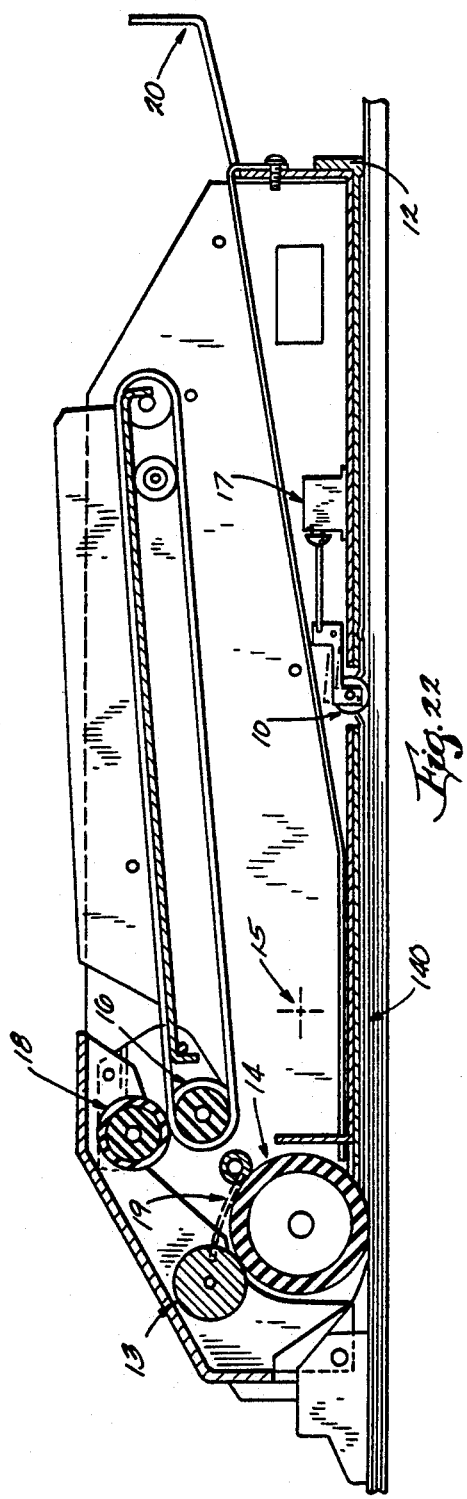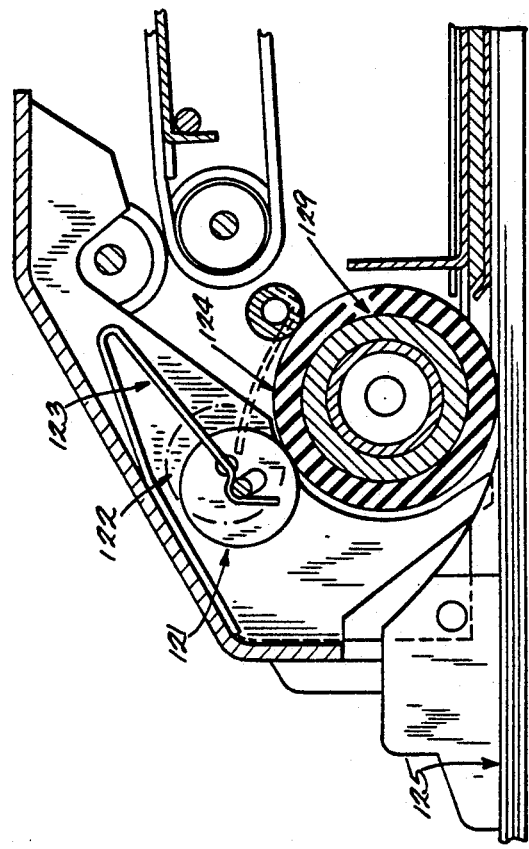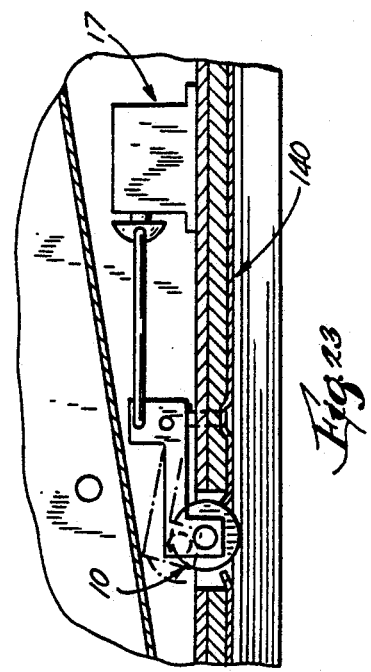

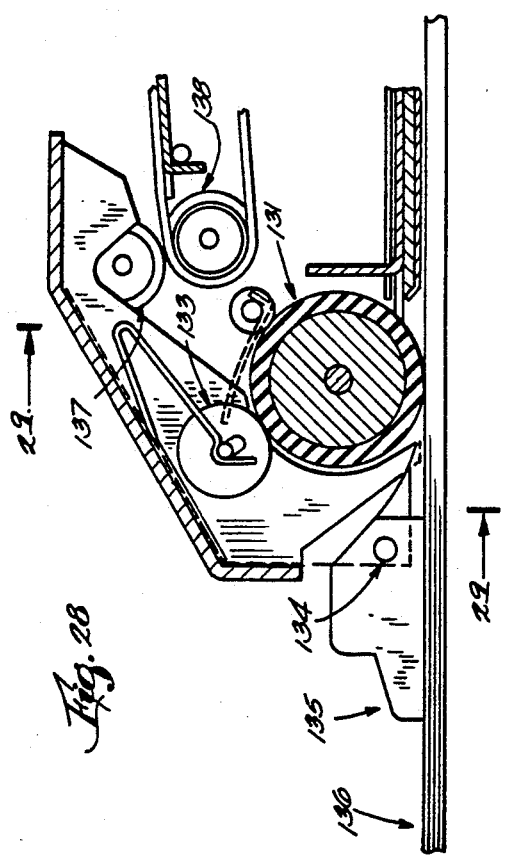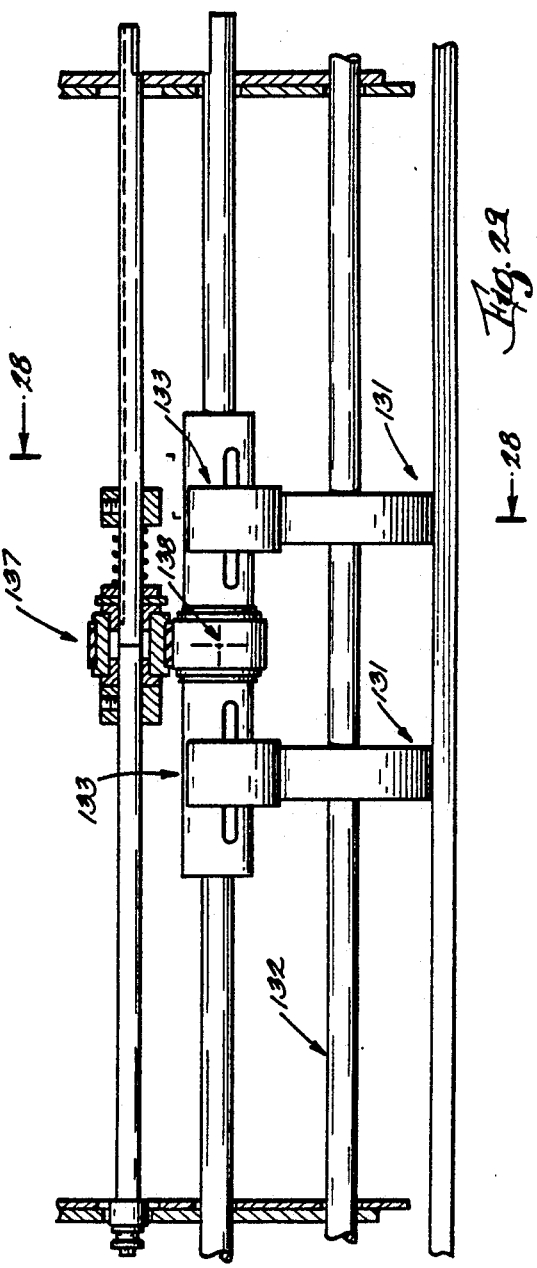

DOCUMENT FEEDER

The present invention is a CONTINUATION of Applicant's pending application Ser. No. 247,384, now abandoned which was filed on Sept. 21, 1988 and which, itself, was a CONTINUATION-IN-PART of application Ser. No. 172,978, filed Mar. 28, 1988, now U.S. Pat. 4,925,178 granted May 15, 1990.

It is also a CONTINUATION of U.S. application 182,614 filed Apr. 18, 1988 (now abandoned), and is a companion application to Application Ser. No. 182,352 (now U.S. Pat. No. 4,936,563) and of application Ser. No. 182,592 now U.S. Pat. No. 5,022,639.

BACKGROUND OF THE INVENTION

This Application is also related to the subject matter of U.S. Pat. No. 4,632,376 issued Dec. 30, 1986 and U.S. Pat. No. 4,674,738 issued June 23, 1987. Related applications have been filed in Japan, Korea, Taiwan, and the European Patent Office. The European Application was published June 3, 1987 as No. 224,171A.

All the above applications and patents relate to inventions of the Applicant herein.

The present invention relates to document copying devices and particularly to a sheet-feeding mechanism for advancing, seriatim, the individual sheets from a stack of sheets to be copied.

The stack of sheets is placed on a holder, and the mechanism automatically feeds the bottom-most sheet onto the copier, on demand, as the copier operates.

In the past, sheet-feeding mechanisms have generally been large, bulky, and heavy, supported to one side of the copying surface on or adjacent the frame of the copier, with complicated drive-mechanism to interact between the sheet-feeder and the copier when the sheet-to-be-copied is advanced to the copy position of the copier.

Illustrative of the type of document feeders known in the past is that shown in FIG. 12 herein, as well as in U.S. Pat. No. 4,674,735 issued June 23, 1987. See also British Patent 922,780 and U.S. Pat. No. 4,368,881.

SUMMARY OF THE PRESENT INVENTION

In the present invention, the document feeder is a compact, box-like unit which rests directly upon the glass plate copying surface of the copy machines. It can be used with copiers having a stationary copying surface or those having a reciprocating copying surface. It is to be understood that the copying machines, which may be well-known office copiers, facsimile, or electronic mail copiers, (as well as the copies which are made thereby), are not a part of this invention.

The document feeder has a cover which also functions as a tray-support for the documents to be copied. When the operator chooses to use the document feeder, the box is placed directly upon the glass plate of the copy machine and the cover is raised into an inclined support-position for the documents.

The set of documents to be copied is placed face-up on the inclined support with the first page on the top, and with the bottom (or last) page of the document, as it rests on the tray, coming into contact with a feed roller of the feeder.

Upon command, the feed roller rotates to remove the bottom sheet of the document from the tray support and (in cooperation with a drive-wheel) transers it face-down onto the glass plate of the copier.

After the document has been copied, and while the copier is re-cycling, the drive wheel reverses direction, removes the document from the glass plate and transfers it face-up into a document-receiving tray.

During the next cycle, the drive wheel reverses and brings the next sheet from the stack of documents onto the glass plate, and the sequence is repeated.

After all the sheets have been copied, the documents may be removed from the receiving tray, the document support can be lowered to its position as a cover for the feeder, and the feeder may be removed from the copy machine.

The copier discharges the newly-made copy face-up into its copy-receiving tray and, therefore, the new set of copies are in order, when finished, with the top page on top.

Inasmuch as the newly-prepared copies, as well as the re-stacked set of copied documents are discharged from the copier face-up, all copies and documents are in proper sequence with the first page at the top of the stack and re-stacking is not required.

The document feeder of the present invention is lightweight, simple and uncomplicated, and can be manufactured inexpensively and sold at a reasonable price. It can be used with a copier by an inexperienced operator and does not need a skilled service person for installation or operation.

The principle object of the present invention is to provide a document feeder which is small, compact, high-speed, easily transported, lightweight, and inexpensive.

A further object of the present invention is to provide a document feeder which can be used with any standard and well-known copy machine having either a stationary glass plate or a reciprocating glass plate.

Another object is to provide a low-cost feeder which can be easily connected to the copier so that the operation of the feeder may be automatically controlled from the control panel of the copier.

With the above and other objects in view, more information and a better understanding of the present invention may be achieved by reference to the following detailed description.

DETAILED DESCRIPTION

For the purpose of illustrating the invention, there is shown in the accompanying drawings a form thereof which is at present preferred, although it is to be understood that the several instrumentalities of which the invention consists can be variously arranged and organized, and that the invention is not limited to the precise arrangements and organizations of the instrumentalities as herein shown and described.

In the drawings, wherein like reference characters indicate like parts:

FIG. 1 is a top perspective view of the document feeder of the present invention.

FIG. 2 is another top perspective view of the document feeder of the present invention with the document support tray in elevated position.

FIG. 3 is a schematic side elevational view of the document feeder showing the sheet-path through the feeder mechanism.

FIG. 4 is a plan view of the document feeder on a copier, showing a flange to cover the unused portion of the glass and to position the document feeder.

FIG. 5 is a schematic illustration of the sheet-advancing feed wheels.

FIG. 6 is a schematic illustration of the forces acting on the sheets.

FIG. 7 is a greatly enlarged diagram of the frictional forces acting upon the sheets.

FIG. 8 is a schematic illustration of an alternate feed/sheet separator mechanism.

FIG. 10 is a side elevation of a section as shown generally at 10—10 of FIG. 9

FIG. 11 is a fragmentary cross-section shown generally at 11—11 in FIG. 4.

FIG. 17 is a fragmentary front elevational view of a lightweight pivot arm for a paper-stop.

FIG. 18 is a vertical sectional view taken generally along line 18—18 of FIG. 17.

FIG. 19 is a vertical, fragmentary, cross-sectional view of a modification of the end-stop of the present invention.

FIG. 20 is an enlarged, fragmentary, sectional view of the end-stop shown in FIG. 19.

FIG. 21 is a fragmentary bottom plan view of the edge-guide of the present invention.

FIG. 22 is a longitudinal vertical cross-sectional view of a modification of the feeder of the present invention.

FIG. 23 is an enlarged fragmentary sectional view of a portion of the feeder of FIG. 22.

FIG. 27 is an enlarged fragmentary vertical sectional view of the left-hand end of the feeder shown in FIG. 22.

FIG. 28 is the modified version of the arrangement shown in FIG. 27 taken generally along line 28—28 of FIG. 27.

FIG. 29 is a sectional view taken generally along line 29—29 of FIG. 28.

Figure 9:
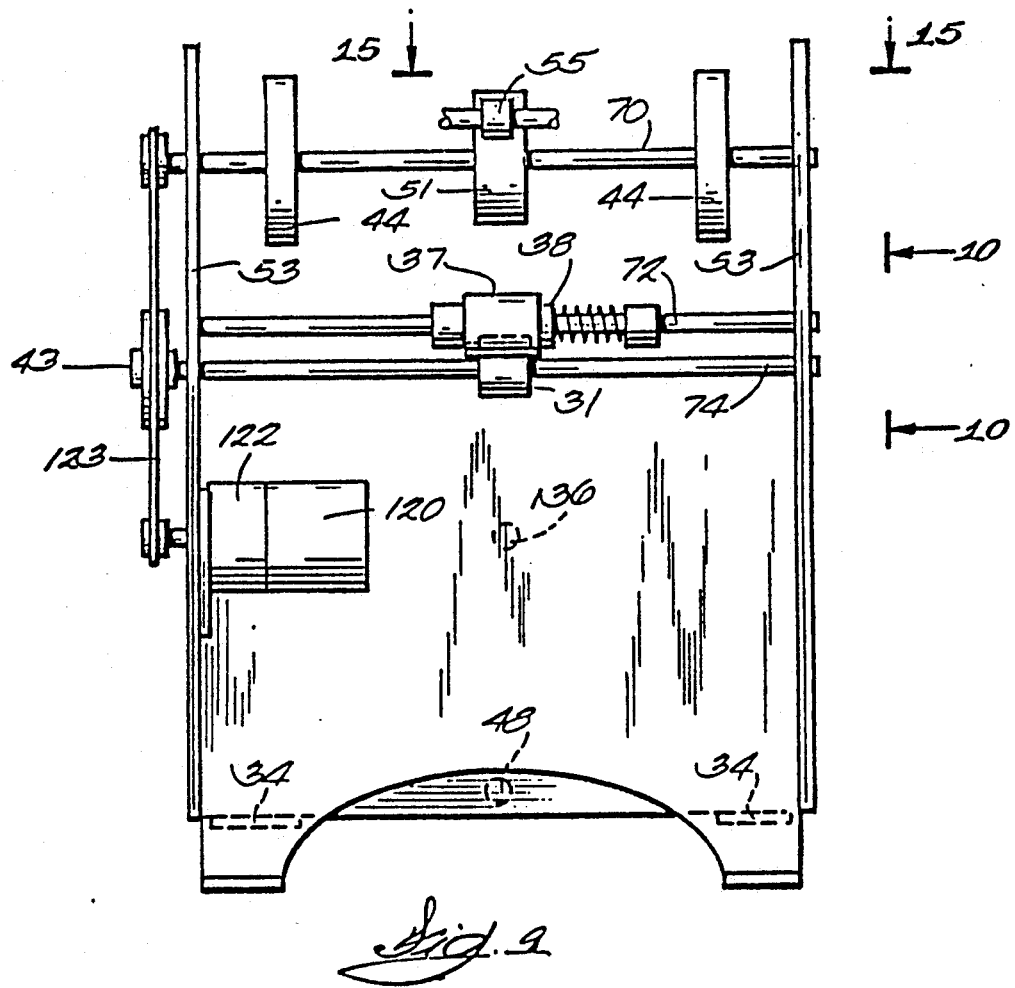
FIG. 9 is a schematic drawing of the power-train or drive-mechanism of the present invention.
Figure 12:
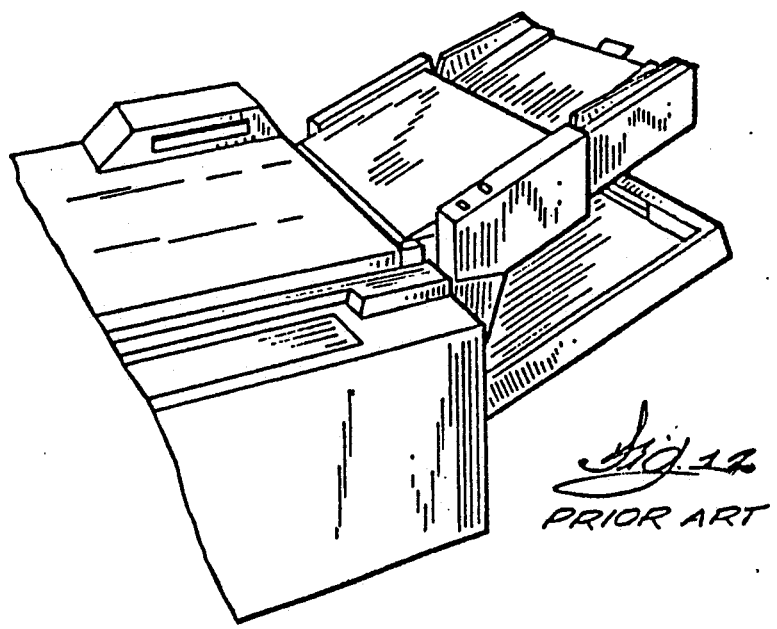
FIG. 12 is an illustration of a prior-art feeder.

In the present invention, a feeder 21 of generally box-like configuration has a body 22 and a top 23 (shown open at 23a and closed at 23b). The body 22 has a bottom 24 which is a generally rectangular frame having side portions 25 and an opening 26a (FIG. 4 & 11).

The bottom portion 24 is designed to be placed upon the glass plate of a copy machine, but supported above the copier glass to provide a thin space 26a of appropriate size between glass and feeder for a document to be received therein.

The top 23 is pivoted at 23c so that it can tilt to the position shown in FIGS. 2 and 3, and thus provide an inclined document-support 23a for a stack of documents 28.

As many as twenty or more documents can be supported face-up on the tray 23a and the bottom sheet 30 of the stack of documents 28 comes into contact with a feed roller 31, disposed along a generally central line of the stack of documents. This arrangement eliminates drive wheels and separators near the edges of the documents which, in many cases, may be damaged or wrinkled or otherwise rendered unsuitable for easy separation and feeding of the documents.

The preferred embodiment may be inter-connected with the copier in such a way that the required few watts of the low-voltage power and timing (logic) may be derived directly from the copier. Alternatively, the feeder of the present invention may have its own logic. Power may be supplied from a wall outlet mounted transformer, the copier, or rechargeable batteries. If desirable, the unit can be powered by a dry-cell battery arrangement which would provide the lowest cost of a non-interfaced design.

Additionally, the size of the trays and supports and guides may be appropriately chosen for U.S.-size paper, or for the international size (DIN-A4) used generally elsewhere around the world, or legal-size paper ($8\frac{1}{2}'' \times 13''$ or $8\frac{1}{2}'' \times 14''$).

Because the feeder can be easily removed from the copier, the copier can be used without the automatic document feeder of the present invention.

After the document feeder 21 of the present invention is placed upon the copier 102 in alignment with the registration edge 118, and the tray 23 is elevated to support-position 23a, the stack 28 of sheets to be copied is placed upon the tray 23, face-up. The feeder 21 is resting on the copier glass 112 and positioned by flange 100.

When the copy machine is started, the document feeder is also actuated, either by its own power and logic (in synchronism with the copier) or as instructed by the power and logic of the copier if connected thereto. Then the feed wheel 31 is caused to rotate in the direction of the arrow 32, moving the bottom sheet 30 from the stack 28 around the periphery of the wheel 51 and onto the top of the glass plate 112 in the thin space 26a until it reaches the stop or abutment 34. At this moment, the sheet is in position to be copied and the copying takes place.

The drive wheels on the main shaft 70 are a pair (or more) of wheels 44 and a center wheel 51. The wheel 51 is rubber so as to provide a strong pull on the paper when it is in the bite between the wheel 51 and the cooperating wheel 55. These wheels are relatively firm and the force between wheels 51 and 55 is high enough to pull the document 30 from the stack and overcome the drag of the feed/separation rollers 31 and 37. The wheels 44 are larger in diameter than wheel 51 and very soft, such as the foam rubber used in upholstery padding. The larger diameter allows the wheels 44 to touch the glass, while the wheel 51 does not. The wheels 44 move the paper, without skewing, on-to and off-of the glass and, as only a single sheet is being moved, the force can be low. Wheels 44 may be about 6" apart.

After the copying is finished, the drive wheels 44 and 51 are caused to rotate in the opposite direction (as shown by the arrow 35) and the sheet which was on the copier glass is driven around the drive wheels 44 and 51 (in direction of arrow 46) and deposited in the receiving tray 36.

With a center feed and separator, a center set of pull-out rollers 51 and 55 is needed, and it is preferred to have them driven at a speed faster than the feed from roller 31, and to have a one-way clutch 43 on the feed roller shaft 74 so it will turn freely as the sheet is pulled through the drive. If there is a document in the bite of rollers 51 and 55, these rollers pull the tail of the document through the bite of rollers 31 and 37, causing rollers 31 and 37 to roll at a higher speed than if driven by the motor 120, (as allowed by the one-way clutch 38).

The feeder drive is reversed by the reversal of the power polarity to the motor 120. All of the system then goes in the reverse direction EXCEPT that beyond the one-way drive 43. These parts (shafts 74 and 72, rollers 31 and 37, gear-train 122, and the slip clutch 38) are driven directly by the motor 120 in the feed direction through the one-way drive, but not in the reverse direction. The reverse roller system is a very good way to feed one and only one sheet even when the documents in the stack are of different weights and have different surface finishes. Many of the common feed systems do not work satisfactorily as a bottom feeder because of the weight and drag of the documents above the sheet to be fed. This drag also causes multifeeds.

One or more separation rollers 37, as shown particularly in FIGS. 3, 6, 7 and 9 operate to insure that only the bottom-most sheet 30 in the stack 28 is fed into the copying position.

The principle is simple, elegant and has wide tolerance, as shown particularly in FIGS. 6 and 7. If one assumes likely values of 300 g. of force between the feed roller 31 and separation rollers 37, a coefficient of friction of 1.2 for rubber to paper, or rubber to rubber, and a coefficient of 0.3 for paper to paper, the drive force of the feed roller 31 on the bottom of the bottom sheet 30 is $300 \times 1.2 = 360$ g. If two sheets are in the bite of the rollers 31 and 37, the force between them is still 300 g., but as the friction coefficient is only 0.3, the friction force is only 300 g. $\times 0.3 = 90$ g. If the one-way clutch 38 is set to give a maximum force on the paper of any value from 90 g. to 359 g., the system will function. Assume that the clutch is set to slip at 200 g. force tangent to the surface of roller 37, the friction force of the paper and roller is 360 g., but the force on the paper is limited to 200 g. Therefore, when one document is being fed, the top roller 37 will roll on the paper and slip on the shaft 72. With two or more sheets, the sheet on the side of the drive wheel 31 is acted upon by a net drive of $360 - 90$ g. $= 270$ g., and the sheet(s) not in contact with the drive roller 31 are acted upon by a force of $90 - 200 = 110$ g. (the negative sign shows that the force is in the reverse direction i.e., up and to the right) as shown in FIGS. 6 and 7 and the upper sheet(s) move back out of the bite. With one sheet in the bite, the net drive is 360 g. $-200$ g. $= 160$ g. and the sheet is driven forward. With no paper in the bite, the feed roller 31 drives the retard roller 37 in the direction of arrow 61.

Other feed/separation systems which may be used are a high coefficient of friction feed roller 39 with a moderate coefficient retard member 62 as shown in FIG. 5, or the wheel-and-fence system shown in FIG. 8. Here the extra sheets are not pushed back, but they are kept from feeding forward.

Other well-known feed/separator systems could also be used, such as a sticky-tape system marketed by the 3M Company.

The sheet 30 is slid onto the glass 112 with the two spaced guide-rollers 44 to prevent skewing. The drive should be light enough to move the paper until it hits the end stop 34. The rollers can slip on the paper if the normal force is low, or a weak drive may be used, such as weak motor or another slip clutch.

A gate 45 is placed in the path so that when the sheet is returned by the reversal of the rollers 44 and 52, the paper is directed to the stacking tray 36 in the direction of arrow 46.

A photocell and light 48 indicates when there is a sheet in position at the stops 34.

The photocell 48 may be a mechanical switch so that the light of the copier does not affect it. It may not be needed because the motor 120 can be driven long enough to be certain that the paper is at the stop 34. But it is preferred to have such a signal so that the logic knows that the paper is at the stop readied to be copied. The switch can also be used to indicate when the last sheet had been fed. The logic would be arranged so that when there is no signal two seconds after a FEED, a "beep" is sounded, and a light is illuminated to advise the operator to pick up the documents and/or to stop the copier.

With one drive motor 120 powering all the automatic document feeder on the in-feed, there is a need to stop the feeding after the sheet has reached the registration stop 34, and before the next sheet has reached the gate area 45. If the feed motion is stopped too soon, the first sheet will not be registered on the glass; if too late, the lead edge of the second sheet will hit the first sheet as it exists, or it will have pushed down the gate so that the exiting of the first sheet is not diverted into the stacking area 46. Either way there will be a jam.

To solve these problems, the surface speed of the main drive rollers 55 and 44 must be much faster than the surface speed of the feed roller 31. Furthermore, the switch 48 detects the lead edge of the sheet as it is near the end of its path which is the registration end stop 34.

The preferred design has a thin steel stripper 49 resting on the glass 112 to strip the sheet from the glass when the rollers 44 and 51 rotate in direction of the arrow 35. The edge of the stripper 49 on the glass 112 must be sharp so the edge of the paper does not stub against it. The sharp edge may be guarded when the tray 23 is folded or when the entire feeder 21 is lifted from the glass of the copier 102.

The logic of the feeder can either be in the copier when the feeder and copier are connected, or in the feeder where there is no electrical interface. In the case where the feeder has all the logic, there may be a photocell 136 near the center of the bottom 24, or at an edge or corner, to detect the motion of the copier scan lamp. The photocell 136 will then note the passage of the light from the copier scan lamp, and soon after the light passes the center of the feeder, the copying is completed, and it is time to remove one sheet from the glass and put on the next sheet. Some copiers keep the lamp "ON" for the backstroke, some do not. With the lamp "ON" on the backstroke, the feeder would be set to respond to every other light signal.

For some uses, it will be desirable to keep the sheet on the glass while several copies are made. Thus, if four copies of a three-page document are needed, the three-page document 28 is placed face-up in the tray 23a and, with an interfaced unit, the copier would be set for "4 copies" and the "print" button pushed. This would cause the interfaced feeder to feed the 1st document from the stack onto the glass. The copier would then make the four copies and on the backstroke between the fourth and fifth copies, the sheet would be removed and the next sheet put on the glass. Thereafter, the four copies are made, the document are made, the documents are changed, and more copies are made. At the end, the top sheet is removed from the glass and placed in the stacking area 36, face-up, and on top.

The outer main drive rollers 44 are made of a very soft material so that their interference with the glass causes only the light force needed to move the paper, but not so much as to cause excessive drag. The center roller 51 is of a smaller diameter so it does not touch the glass. The difference in diameter may cause paper stress as the paper curves around the curved path defined by 121.

Figure 15:
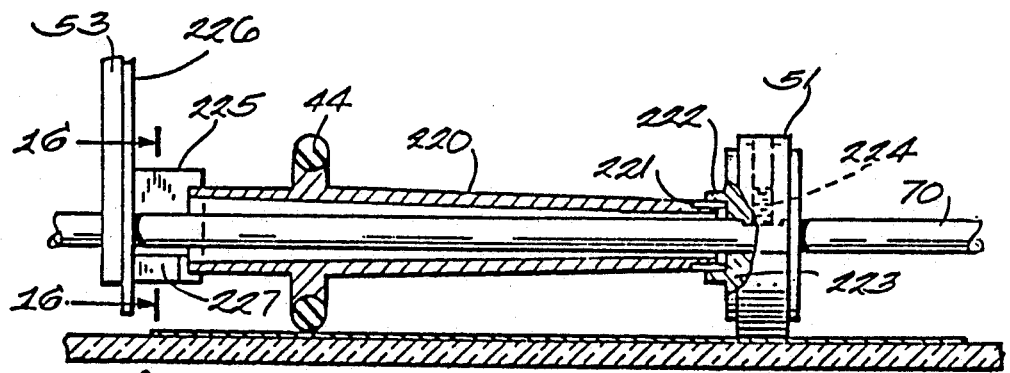
FIG. 15 is a vertical cross-sectional view of one form of drive-wheel taken along lines 15—15 of FIG. 9.
Figure 16:
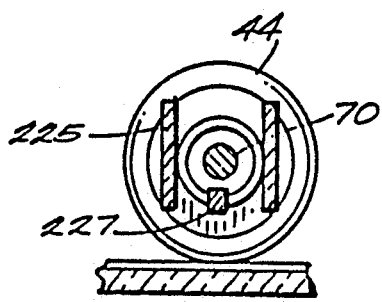
FIG. 16 is a cross-sectional view taken generally along line 16—16 of FIG. 15.

In the improved design shown in FIG. 15, the shaft 220 is driven by a spline 221 which matches and fits the internal spline 222 of the hub 223 secured to shaft 70 by set screw 224. The left end of shaft 220 is free to move vertically but not horizontally as confined by fixed guides 225 of bearing plate 226 mounted on side frame 53. Also extending from 226 are ribs 227 which limit the axial motion of shaft 220.

Rollers 44 and roller 51 can be the same diameter, and rollers 44 rest on the paper, or the glass 112 if there is no paper there. The force is light, as determined by the weight of the part, and/or a spring load. There is a gap between the bottom of roller 51 and the paper or glass. The roller rubber tires 44 may be solid, strong material as the load on the paper is not determined by the deflection on the material.

The action of the feeder of the present invention may be better understood by the following description:

During the FEED operation, as the bottom sheet 30 of the set of documents 28 is separated and fed to the glass 112, the motor 120 through gears 122 drives the system in the direction of the arrows 32, 61 and 50 on rollers 31, 37 and 51, respectively. Roller 55 is driven by roller 51 and always rolls with it. Sheet 30 is moved to the lower left in FIG. 3 as the friction of roller 31 on the sheet 30 is higher than the slip-clutch setting of the retard roller 37. When the lead edge of sheet 30 hits the top side of gate 45, it pushes it down and moves into the bite of the rollers 51/55. These rollers are turning at a higher surface speed than the sheet as driven by wheel 31, and have a greater pulling force. They thus pull the sheet out of the rollers 31/37 causing roller 31 to turn faster than it would have been driven. The document is curved around by guides 121 and stripper 49 onto the copier glass 112. It passes under the rollers 44 which are in light contact with the glass near the edges of the sheet. They move the sheet through the thin space 26a between the glass 112 and the bottom-plate 24 of the feeder 21 until the leading edge of the sheet hits the end stop 34. The rollers 44 have such a light drive on the sheet that they slip until the motor stops, as signaled by the electric-eye switch 48. The document is now positioned on the copier glass and the copies can be made.

During the TAKE-OFF operation, the motor 120 reverses and the shaft 70 drives rollers 44 and 51 in the direction of arrow 35 in FIG. 3. Since the rollers 44 are in contact with the sheet, the sheet is driven to the left in FIG. 3 and diverted by the sharp edge of stripper 49 into the bite of rollers 51/55. As the gate is normally in the position shown in FIG. 3, the sheet is guided in direction of arrow 46 into the stacking tray 36.

A feeder of the type described will feed one sheet and, as the end of that sheet exits the feed/separation rollers 31/37, the next sheet will start to feed. The sheets would be touching head to tail, but in the present invention, when the first sheet reaches the main drive rollers, it is pulled faster than it was fed. This faster down-stream feed will create a gap between the tail of the first sheet and the lead edge of the next. This gap will be larger if the main drive pull overcomes the drag of the feed roller. The one-way clutch 38 on the drive shaft 72 allows it to drive, but as the first sheet is pulled faster than the drive, the drive roller 31 is free to turn faster. The gap between the tail of the first sheet and the lead edge of the next sheet, and thus the speed difference, must be enough that the first sheet is moved to the registration stop 34 before the next sheet, which starts to feed when the tail of the first is pulled from the feed rollers, reaches the gate area.

More than the theoretical gap must be allowed as the motor coast will move the lead edge of the second sheet. Also, allowance must be made for possible imperfect separation where the second speed is pulled into the feed/separation bite 31/37.

For some copiers, it will be preferred to have a long spring stripper 49 so that it extends under the left edge of a sheet 30 when on the glass 112. Thus the stripping of the sheet from the glass is not needed, because the left end was not resting on the glass. This will be best on copiers which do not copy that edge of the document, and thus the end of stripper 49 will not be seen on the copy.

When there is already a sheet on the glass, the TAKE-OFF operation precedes the FEED operation.

As shown in FIG. 9, the motor 120 drives a belt 123. This belt drives shafts 70 and 74 in the FEED direction. Due to the pulley and roller sizes, the surface speeds of the rollers 44 and 51 are much greater than that of the roller 31. When the motor is reversed, only shaft 70 is driven directly by the motor due to the one-way clutch 43 on shaft 72.

While a reflective photoswitch can be used for the paper switch 48, this requires electronics and could be confused by the bright light of the copier. A mechanical switch is preferred.

The novel design is for a very light force paper switch which rests on the glass. This requires a flag having a close tolerance as the paper is thin and weak and may be very close to the glass. The freedom of the flag to rest on the glass under the effect of gravity and/or spring pressure, in spite of mechanical tolerance of the parts or their warpage, is novel.

Figure 13:
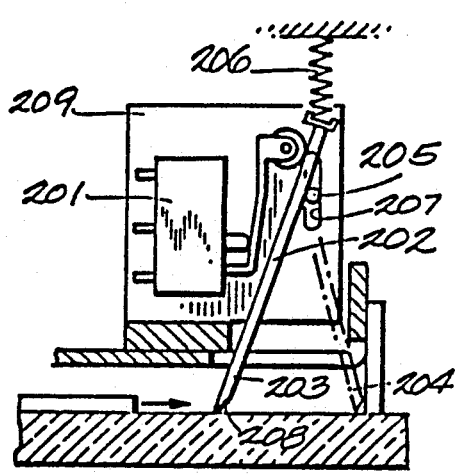
FIG. 13 is a vertical schematic drawing of one form of paper-stop.
Figure 14:
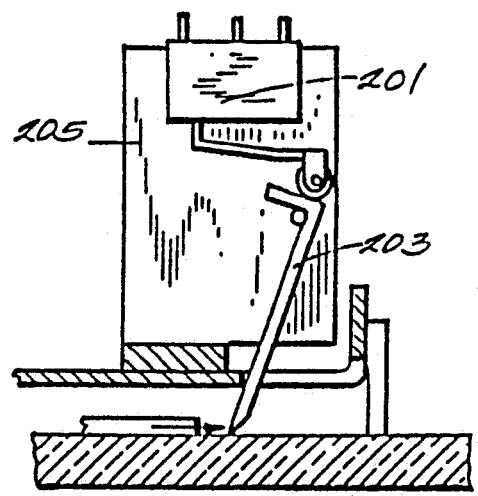
FIG. 14 is a vertical schematic view of another form of paper-stop.

Two embodiments of the switch are shown in FIG. 13 and FIG. 14. The standard snap switch 201 is operated by the pivoted metal flag 203 which is pivoted on shaft 205 which is welded to the flag and is free to move vertically in slots 207 in the fixed holder 209. It is shown in its home position at 203 and in its deflected position as 204. The sketch also shows the bevel 208 on the bottom of the flag so that a sheet of paper does not get under the flag. This design assures that the sharp edge of the flag is lightly on the glass, but free to move in response to the edge of the paper. The flag is returned to its normal position by the spring of the switch.

As the paper hits the flag with a considerable velocity, and as the flag needs to move with the paper and along the glass, there is sometimes a tendency for the flag to hop up and for the paper to slide under. This mode of failure can be eliminated by a light spring force downward on the flag, shown as springs 206.

FIG. 14 shows an alternate design which can be used where added headroom is available. The spring of the switch both returns the flag and adds the downward spring force needed on the flag.

FIGS. 17 and 18 show another design wherein the feed 210 and 211 of the flag 212 are pivoted at 213 so that the bottom of the feet always slide the glass plate and prevent the sheet from slipping beneath the flag.

FIG. 10 illustrates the gears connecting shafts 74 and 72. The shaft 72 turns slower than shaft 74, as shown by the gear train 124. This saves power and permits use of a smaller motor. A belt can also be used. The shafts 72 and 74 are driven in the same direction as shown by arrows 50. Roller 37 is loaded against roller 31 with a known and constant force. This can be caused by a built-in interference of the rollers, depending on the softness of the rollers, or the bending of the shafts, to determine the force. The ends of shaft 72 may be guided in slots 52 in frame 53 (as shown in FIGS. 5 and 9) and loaded with a light spring (not shown) in direction of arrow 54.

FIG. 4 and 11 show the feeder 21 on a copier 102 with a control panel 104, a cover 110, and a registration edge 108 and 118 around glass 112. The feeder 21 is positioned to insure that the document, when on the glass 112 and at the stops 34, is where the copier needs the document to be located for a proper copy to be made. A flange 100 fits between the lower edges of the feeder 21 and the edge 108 to hold the feeder in place to block the light, and to provide a white surface on the copier glass.

EXAMPLE

In the present invention, the lead edge of the first sheet moves about 2" from the feed/separator rollers 31/37 and is then gripped by the pinch of the main shaft roller 51 and its idler roller 55. The main roller pulls the sheet from the feed/separator bite, aided by the one-way clutch 38. With the customary 11" long paper, the main roller must move the lead edge of the paper about 13" to reach the registration stop; i.e., the 11" length and an added 2" around the main drive roller which gets the tail of the sheet on the glass. This motion must be done as the next sheet, which is being fed by the feed/separator rollers, moves toward the gate area. The next sheet can move about ¾" before there is any interference.

Thus, using the above figures, the limiting case for the minimum excess speed of the main drive over the feed drive is that the main drive must move the paper 13" before the lead edge of the next sheet moves ¾" past the feed roller. The feed roller will not start to feed the second sheet until the tail of the first sheet has been pulled free of the roller, assuming the separation is perfect. Thus the main drive must move the first sheet the 2" to the registration edge before the second sheet moves the ¾" to the gate area. The main drive must be over 2.7 times as fast as the feed. (Ratio=2/.75=2.6666 ...)

In this embodiment with 0.75" diameter feed roller, a 1.4" diameter main drive roller, and a belt drive with a speed ratio of 3.33 faster main drive to feed drive, the main drive ratio is 6.2: i.e., comfortably over the minimum and allowing for motor coast an the occasional imperfect separation where the next sheet may be dragged by the first. The advance of the second sheet past the feed roller is about 0.6" with a quick-stop circuit on the motor. (As a check, the calculated motion with a 6.2 ratio is 2/6.2=0.32". The paper feed speed, before the main drive pulls the sheet, is about 6" per second at the normal 36v. This suggests a delay of the quick-stop relay and the stopping of the motor of 46 ms, a reasonable number.)

A modified embodiment of the present invention is shown in FIGS. 19-21.

Referring now to FIG. 19, the end-stop 12 and the receiving-tray end-stop 20 can be made to slide from its normal position to a position 3" to the right.

This will allow both Letter (11" long) and Legal (14" long) sheets to be used. A method to keep the paper flat is provided by the plate 22. This plate will keep the sheet flat on the glass of the copier and prevent the sheet from buckling as it squares itself on the end-stop.

The stops can be held in position by detent 24 or other common means.

Black edges on the copy are to be avoided. When a set of copies are handled, any consistent black edge is objectionable as it is obvious to the recipient of a number of copies.

The end-stop 12 as shown in FIG. 20 is made thicker, about ⅛, than one would expect so that the document to be copied is shifted to the left of the normal registration point by this amount. The bevel 30 of the end-stop forces the paper to be very near the glass, and the action of the main rollers slipping on the sheet when it hits the end-stop causes it to square-up with the end-stop.

Thus the copier "sees" the bottom of the white end-stop and the paper as a continuous white surface with only the slightest line between the two. Thus the right edge that is imaged, and that is on the copy, is the white end-stop and a black edge is not seen on the copy at this end.

The other end (the left end as shown here) would, with a thin end-stop, have a severe black-edge problem. The thick end-stop cures this problem. With a thin end-stop, the image of the left end of the paper is about coincident with the end of the copy sheet. Variation of the registration of the copier mechanism or the random variation of the copy paper feed registration often cause the dark shadow beyond the left end of the document to be imaged on the copy sheet. The image of the dark shadow causes a dark edge on the copy. This undesirable dark edge is cured by the thick end-stop as the document is offset so the image which is on the copy is always of the document and not the dark shadow.

For the same reasons as described above, the material beyond the long edges of the letter-size paper should be white and close to the glass of the copier so that the image on the copy paper is of a white object, even if the document and/or copy paper is a bit out of position. White backing shown in FIG. 21 is provided outboard of the edge rollers 40, provided by the thin flexible material of White Mylar 42 at the edges. This thin white material extends far enough that the trail edge of the sheet is always above the White Mylar.

There is often a slight skew as paper is fed onto the glass. This would be noticed on the copy and is objectionable.

The solution is in the general configuration of the feeder with the sheet confined to a thin, flat space 140, hitting a smooth end-stop, and driven by edge rollers with limited driving force. The confined paper is stiff enough so that the paper does not buckle in the thin space allowed and the rollers skid on the top of the paper for the equivalent of several inches of paper motion.

As is well known, a sliding object has essentially no friction in the direction perpendicular to the sliding motion. In this case, the paper is driven toward the end-stop by the friction of the edge rollers spinning on the paper. With skew, one edge of the paper will hit the end-stop first and the push of the rollers will square the paper to the end-stop because the paper can slide across the rollers when they are slipping on the paper.

A further modification of the embodiment of the present invention is shown in FIGS. 22-29.

A half-letter (5.5×8.5") sheet, long edge first (LEF), to the stop 5.5" from the normal registration edge needs an added set of new rollers 10 as shown in FIG. 22.

These are driven at the same speed and direction as the main rollers 14. The new rollers are two soft rollers about 7" apart, turned by a single shaft. The two shafts can be linked by a belt or a train of gears outside the frame.

The main and new rollers turn counter-clockwise to feed a sheet onto the glass. The main roller 14 cooperating with pinch roller 13 pull a sheet from the feed/separation rollers 16/18 and turn it around and push it across the glass of the copier. The sheet, measuring 5.5" in the direction of motion, is picked up by the new rollers before it leaves the control of the main rollers and is driven to the end stop 12.

As a sheet is fed off the glass, the main and new rollers are driven in the opposite direction. The gate 19 is in its home position, up. The sheet moves left, around the main roller about 180 degrees, and then right into the lower tray 15.

The logic is modified so that the length of the sheet is determined by the length of time the gate 19 is depressed as the paper is driven past it on the way onto the glass. The shorter sheets need a longer drive-on time after the tail of the sheet has left the gate (or the time that the motor is kept on could be the same for either sheet and is measured from when the lead edge of the sheet depresses the gate). I prefer to measure from the end of the sheet leaving the gate and to have a shorter time for the 11" sheet and a longer time for the 5.5" long sheet.

Alternatively, the rollers may be lifted clear of the paper path when the letter size paper is used so that the paper is free to square itself at the end stop. This lifting is a preferred design for paper squareness, but for operator convenience it is good to have no manual adjustment. A solenoid 17 is shown and the logic which knows whether a long or short sheet has been fed can raise or lower the rollers.

Figure 24:
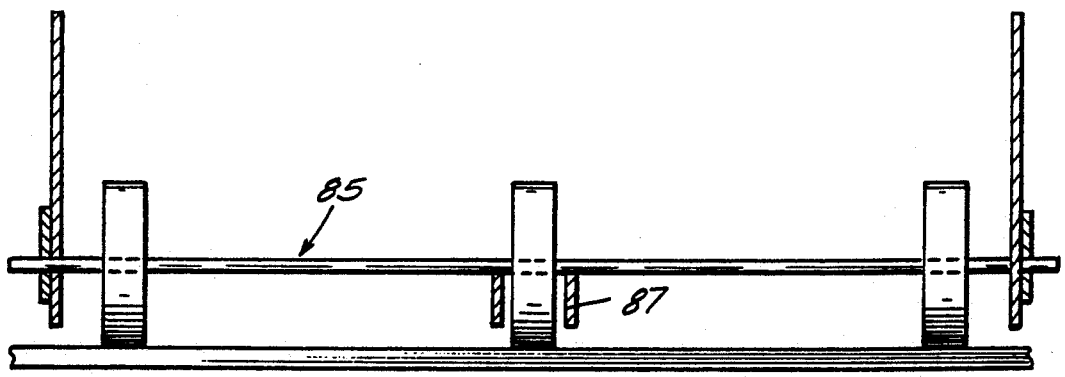
FIGS. 24, 25 and 26 are enlarged, detailed views of modifications of the soft-surface rollers of the present invention.
Figure 25:
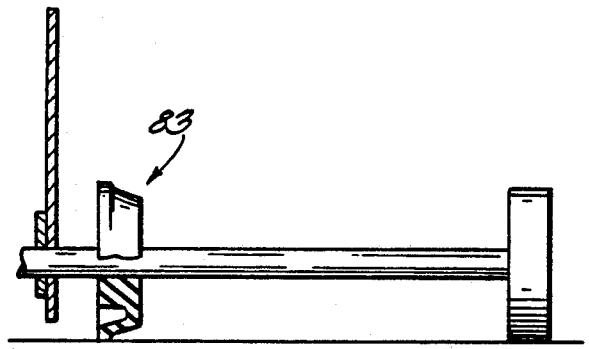
Figure 26:
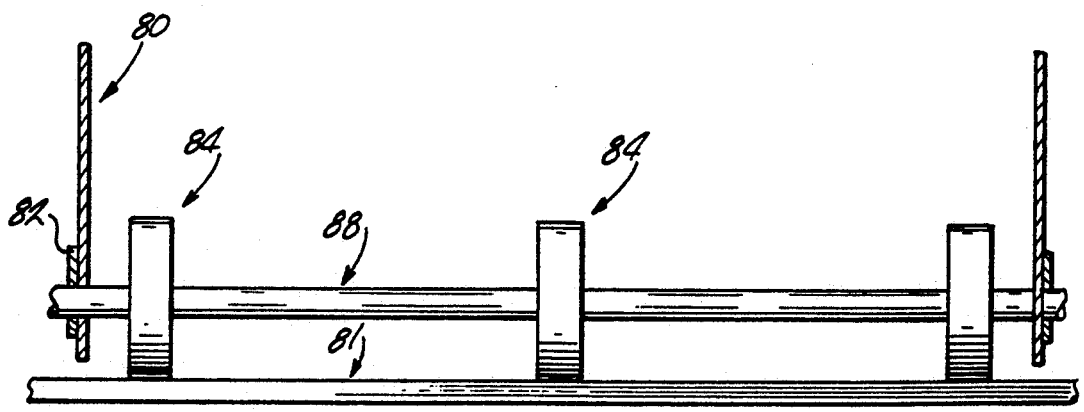

FIGS. 24, 25 and 26 illustrate the main drive shaft.

Larger, very soft edge rollers 84 are mounted on a rigid shaft 86 and have the required interference with the paper on the glass. The needed force of the edge rollers is set high enough to provide the frictional force for the rollers to drive the paper, but low enough so that the rollers will slip as the paper is fed into the end stop rather than buckle the paper. Also, the force must be low enough so that the motor does not stall and so that there is no "squeal" of the rubber slipping on the glass.

The shaft 86 is in bearings 82 mounted on the frame 80. The center roller 88 does not touch the glass, as this should be harder to provide the pull of the paper from the feed/separation rollers 16 and 18 provided at the bite of the pinch roller 13

The soft edge rollers may be rubber foam such as used in upholstery, etc. As an alternate, the use of stronger, more durable rubber can be used, and the softness can be from the shape, as shown in 83 in FIG. 25. This is the preferred design.

There may be some advantages in keeping all three of the rollers the same diameter so that the surface speed is the same, and to lessen the paper noise caused as the paper is bent in more than one direction. To do this, a thin flexible shaft can be used and bent as shown in FIG. 26. The added up-force is provided by bearings 87.

It is to be understood that the present invention may be embodied in other specific forms without departing from the spirit or special attributes hereof, and it is therefore desired that the present embodiments be considered in all respects as illustrative, and therefore not restrictive, reference being made to the appended claims rather than to the foregoing description to indicate the scope of the invention.

Having thus described my invention, what is claimed as new and desired to protect by Letters Patent are the following:

1. An automatic document feeder for a document copier having an image glass and a copy light, said document feeder arranged to be supported above the image glass and including:
   a first document support member for supporting a stack of documents face-up thereon, and
   a second document support member for receiving the documents thereon face-up after having been copied, and
   means for removing a document from the first document support, passing it in one direction at a pre-determined speed through a guide path and placing it face down on the image glass of the copier, and
   feed rollers for moving the document along the image glass to a stop, whereupon the document comes to a halt while the feed rollers continue to rotate, squaring the document against the stop, and
   means for removing said document from the image glass after having been copied, passing it in the opposite direction through the aforesaid guide path substantially at the same pre-determined speed and placing it face up in the second document support member, and
   including an adjustable paper guide and edge control which eliminate black edges on the copied material.

2. An automatic document feeder for a document copier having an image glass and a copy light, said document feeder arranged to be supported above the image glass and including:
   a first document support member for supporting a stack of documents face-up thereon, and
   a second document support member for receiving the documents thereon face-up after having been copied, and
   means for removing a document from the first document support, passing it in one direction at a pre-determined speed through a guide path and placing it face down on the image glass of the copier, and
   feed rollers for moving the document along the image glass to a stop, whereupon the document comes to a halt,
   said feed rollers including a pair of soft rollers which contact the document and continue to rotate, squaring the document against the stop.

* * * * *